(12) United States Patent
Shaffer et al.

(10) Patent No.: US 8,520,676 B2
(45) Date of Patent: Aug. 27, 2013

(54) SYSTEM AND METHOD FOR MANAGING ACKNOWLEDGEMENT MESSAGES IN A VERY LARGE COMPUTER NETWORK

(75) Inventors: Shmuel Shaffer, Palo Alto, CA (US); Jean-Philippe Vasseur, Saint Martin d'Uriage (FR); Sandeep Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 294 days.

(21) Appl. No.: 12/942,985

(22) Filed: Nov. 9, 2010

(65) Prior Publication Data

US 2012/0113986 A1  May 10, 2012

(51) Int. Cl.
*H04L 12/28* (2006.01)

(52) U.S. Cl.
USPC .......... 370/390; 370/329; 370/392; 370/400; 370/408

(58) Field of Classification Search
USPC .................. 370/329, 390, 392, 400, 401, 408
See application file for complete search history.

(56) References Cited

U.S. PATENT DOCUMENTS

| | | | |
|---|---|---|---|
| 6,134,599 A * | 10/2000 | Chiu et al. ................ | 709/252 |
| 6,275,859 B1 * | 8/2001 | Wesley et al. ............. | 709/229 |
| 6,331,983 B1 * | 12/2001 | Haggerty et al. .......... | 370/400 |
| 6,370,142 B1 * | 4/2002 | Pitcher et al. ............. | 370/390 |
| 6,415,312 B1 * | 7/2002 | Boivie ...................... | 709/200 |
| 6,502,140 B1 * | 12/2002 | Boivie ...................... | 709/238 |
| 6,505,253 B1 * | 1/2003 | Chiu et al. ................ | 709/235 |
| 6,515,994 B1 * | 2/2003 | Chuah et al. ............ | 370/395.6 |
| 6,735,201 B1 * | 5/2004 | Mahajan et al. .......... | 370/390 |
| 6,907,011 B1 * | 6/2005 | Miller et al. .............. | 370/254 |
| 6,947,434 B2 * | 9/2005 | Hundscheidt et al. ...... | 370/401 |
| 7,103,679 B2 * | 9/2006 | Bonn ....................... | 709/245 |
| 7,372,853 B2 * | 5/2008 | Sharma et al. ............ | 370/390 |
| 7,564,786 B2 * | 7/2009 | Lim et al. ................. | 370/230 |
| 7,693,074 B2 * | 4/2010 | Yasukawa et al. ......... | 370/238 |
| 7,969,883 B2 * | 6/2011 | Balint et al. .............. | 370/235 |
| 8,130,776 B1 * | 3/2012 | Sundararajan et al. ..... | 370/401 |
| 8,233,402 B2 * | 7/2012 | Duffield et al. ........... | 370/252 |
| 2001/0025310 A1 * | 9/2001 | Krishnamurthy et al. .. | 709/223 |
| 2002/0143951 A1 * | 10/2002 | Khan et al. ............... | 709/227 |
| 2002/0150094 A1 * | 10/2002 | Cheng et al. ............. | 370/389 |
| 2004/0018839 A1 * | 1/2004 | Andric et al. ............. | 455/433 |
| 2004/0264462 A1 * | 12/2004 | Bardalai et al. .......... | 370/390 |
| 2005/0193177 A1 * | 9/2005 | Moga et al. .............. | 711/145 |
| 2005/0220054 A1 * | 10/2005 | Meier et al. .............. | 370/331 |
| 2006/0203819 A1 * | 9/2006 | Farinacci et al. ......... | 370/390 |
| 2007/0162810 A1 * | 7/2007 | Sato et al. ................ | 714/748 |
| 2008/0175195 A1 * | 7/2008 | Cho et al. ................ | 370/329 |
| 2008/0310414 A1 | 12/2008 | Yonge, III et al. | |
| 2009/0262718 A1 * | 10/2009 | Meier et al. .............. | 370/338 |
| 2010/0031110 A1 * | 2/2010 | Seok et al. ............... | 714/748 |
| 2010/0054137 A1 * | 3/2010 | Deng et al. ............... | 370/247 |
| 2011/0019673 A1 * | 1/2011 | Fernandez Gutierrez .... | 370/390 |

* cited by examiner

*Primary Examiner* — Andrew Lai
*Assistant Examiner* — Andrew C Lee
(74) *Attorney, Agent, or Firm* — Fish & Richardson P.C.

(57) ABSTRACT

A multicast message may be distributed by receiving, at a first node in a multicast network, a multicast message from a parent node of the first node. The multicast message is transmitted to child nodes of the first node in the multicast network. A population of the child nodes to which the multicast message was transmitted is accessed and acknowledgement messages which reveal child nodes that are among an acknowledging subset of less than all of the child nodes of the first node are received. Child nodes revealed by the received acknowledgement messages are compared with child nodes determined to be among the population of child nodes to which the multicast message is expected to be received. Based on results of the comparison, a compressed non-acknowledging subset is identified and transmitted to the parent node.

29 Claims, 8 Drawing Sheets

SYSTEM AND METHOD FOR MANAGING ACKNOWLEDGEMENT MESSAGES IN A VERY LARGE COMPUTER NETWORK

RELATED APPLICATION

The present disclosure is related to commonly-owned, copending U.S. patent application Ser. No. 12/942,977, entitled "MULTICAST MESSAGE RETRANSMISSION," which was filed by Shaffer et al. on even date herewith.

TECHNICAL FIELD

The present disclosure relates generally to managing acknowledgement messages in a computer network.

BACKGROUND

Low power and Lossy Networks (LLNs), e.g., sensor networks, have a myriad of applications, such as Smart Grid and Smart Cities. Various challenges are presented with LLNs, as they often include lossy links, low bandwidth, low memory, and/or limitations on battery operation and processing capability, etc.

One particular issue that sometimes confronts LLNs is that they operate over very low bandwidth, making more dramatic the likelihood and impact of packet collisions, which increase with an increase in the number or length of messages. When LLNs are configured to send multicast messages, a relatively large number of acknowledgement messages (ACKs) may occur, overloading the LLN. This issue is particularly evident in large LLNs, e.g., where millions of nodes form the network.

DETAILED DESCRIPTION

Figure 1:
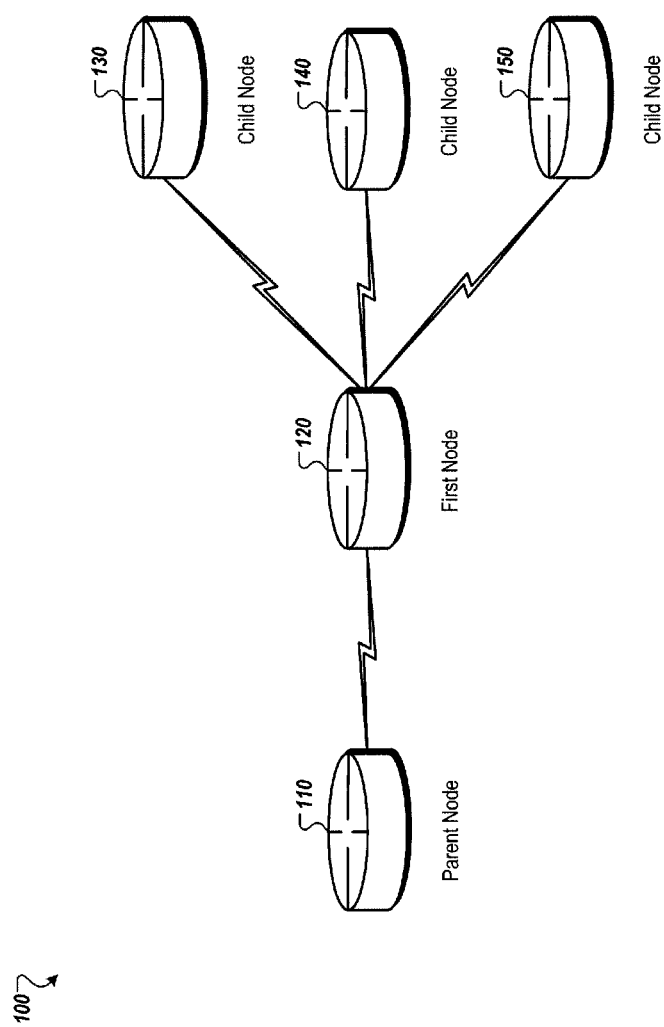
FIG. 1 illustrates an example computer sub-network with three triers of devices.

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, WPC and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network consisting of spatially distributed autonomous devices such as sensors that cooperatively monitor physical or environmental conditions at different locations, such as, e.g., temperature, pressure, vibration, sound, radiation, motion, pollutants, etc. Other types of smart objects include actuators, e.g., responsible for turning on/off an engine or perform any other actions. Sensor networks are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement, and transmit that result) to the sensor sink.

FIG. 1 illustrates an example sub-network 100 with three tiers of devices. The sub-network 100 may represent a sub-network of a larger network that is organized as a directed acyclic graph (DAG), and the sub-network 100 may also be a DAG. In some aspects, a DAG may refer to a directed graph having a property, for example, that all edges are oriented in such a way that no cycles (e.g., loops) exist. All edges may be contained in paths oriented toward and terminating at one or more root nodes (e.g., "clusterheads or "sinks"), often to interconnect the devices of the DAG with a larger infrastructure, such as the Internet, a wide area network, or some other domain. A Destination Oriented DAG (DODAG) may be considered as a DAG rooted at a single destination, e.g., at a single DAG root with no outgoing edges. A "parent" of a particular node within a DAG may refer to an immediate successor of a particular node on a path towards the DAG root, such that the parent can have a lower "rank" than the particular node itself, where the rank of a node can identify the node's position with respect to a DAG root (e.g., the farther away a node is from a root, the higher is the rank of that node). Further, a sibling of a node within a DAG may refer to any neighboring node that is located at the same rank within a DAG Siblings may not necessarily share a common parent, and routes between siblings generally may not be part of the DAG because there is no forward progress (e.g., their rank is the same). A tree may refer to a kind of DAG, where each device/node in the DAG can have one parent node or, as used herein, one preferred parent node. In some configurations, a substantial portion of the DAG may represent a multiple of two or three times the number of nodes in the path between a source and a destination.

This larger network may be organized as a tree, with a root node and children node under the root, or may be organized in a circular shape, with a root in the center, and children nodes in a circular shape around the root node. The larger network may be used, for example, in a smart grid or in a municipal data sensing system.

Nodes in the sub-network 100 may communicate with other nodes through wired or wireless communication channels according to a routing table stored in each node. The routing table can include, but is not limited to, addressing information for a node's parent node, a list of immediate child nodes, a list of all ancestor nodes, a list of all offspring nodes, and a list of sibling nodes. The routing table can be used by a node, when the relationship is known, to determine an address. For example, a parent node 110 may generate a message for a child node (e.g., first node 120), and may look up the address of the parent node's 110 child in the routing table. As such, messages recipients may be described in terms of node relationships, and the addresses for those relationships may be resolved by a node.

A parent node 110 can have at least a child node (e.g., a first node 120) and at least a grandchild (e.g., child nodes 130, 140, and 150). For large networks organized in a DAG, many such sub-networks 100 may exist. In some implementations, each third generation of nodes, beginning with the root node of the entire network, may be designated as a parent node 110, and thus all nodes in the large network may be covered by sub-networks 100. In these implementations, the children of child nodes 130, 140, and 150 would also be parent nodes in other sub-networks.

Figure 2:
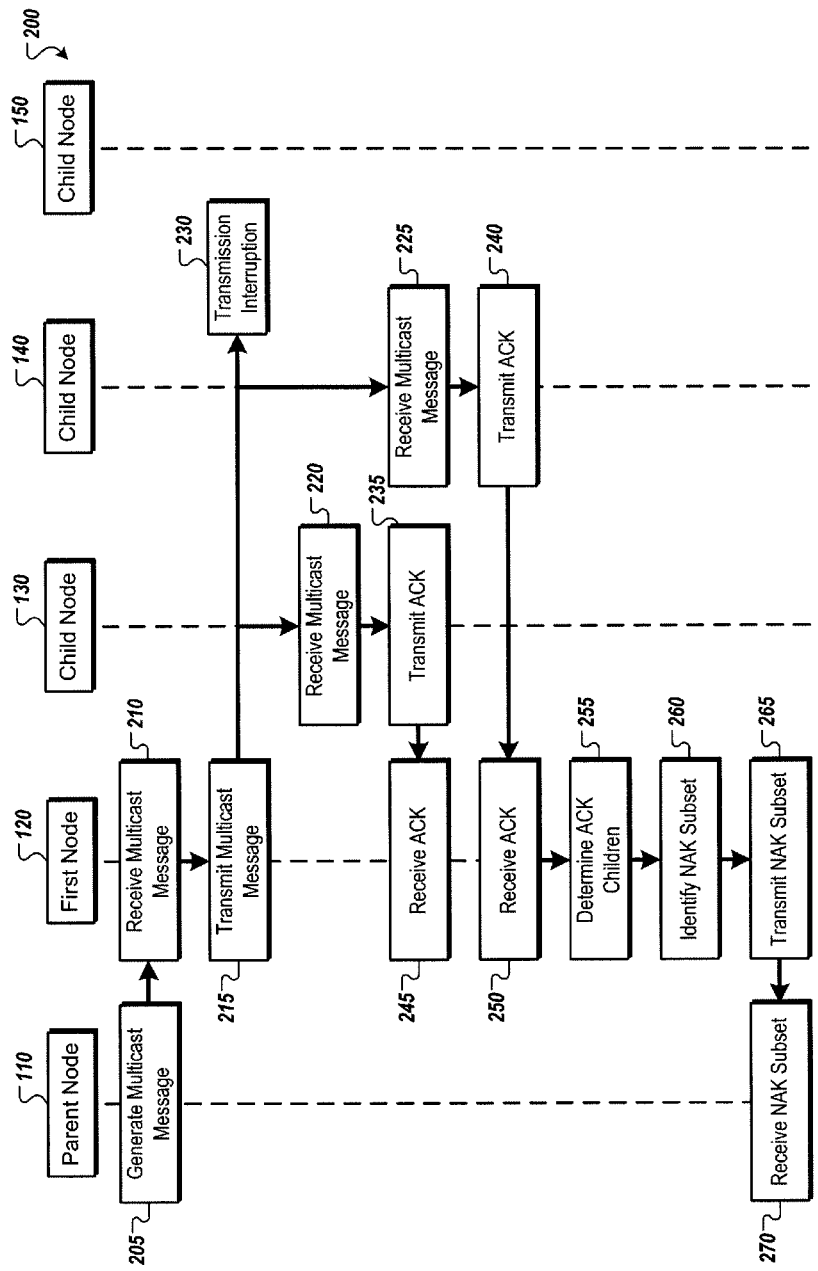
FIG. 2 is a flow chart illustrating an example process for distributing a multicast message in a wireless mesh network.

Through the use of several examples that follow, technologies are described that are applicable to various LLN configurations (e.g., wireless, wireless mesh, and/or Power Line Communications (PLC)). To illustrate, FIG. 2 is a flow chart illustrating an example process 200 for distributing a multicast message in a wireless mesh network. In the process 200, a multicast message is transmitted. In response to receiving a multicast message, a node transmits an acknowledgement message (ACK) in response. The collection of multiple ACK messages that are sent in response is analyzed to identify a group of nodes that did not reply to the multicast message, for example for retransmission. The process 200 can be performed by, for example, a network such as the sub-network 100, and for descriptive purposes will be described in reference to the sub-network 100.

The parent node 110 can generate and transmit (205), or receive and retransmit, a multicast message. In some implementations, the multicast message can be a universal broadcast message, such that every node in a network or sub-network should receive the multicast message. In some implementations, the multicast message can be intended for (or addressed to) a subset of all available nodes. The subset of nodes can be referenced in the multicast message by data such as a list of node addresses that are addressable through a particular multicast address, node characteristics (e.g., any node of a particular model, brand, or software version, or by mathematical formula (e.g., every node in every $N^{th}$ generation, node addresses in a range, etc.) for example.

The first node 120 receives (210) the multicast message from the parent node 110 and transmits (215) the multicast message to the child nodes 130, 140, and 150. In some implementations, the first node 120 can transmit three messages, one to each child node, address only to the child node. Alternatively, the first node 120 can transmit a single message simultaneously to all nodes that it is aware of or within transmission range of, specifying the child nodes 130, 140, and 150. In some examples, the first node 120 may transmit a multicast message to some, but not all, of the first node's 120 children that will themselves transmit the multicast message to their child nodes as appropriate. In some implementations, the first node 120 can transmit a message to child nodes that are not a part of the sub-network 100 with instructions to join the sub-network 100. Once the new child node has joined the sub-network 100, the first node 120 can transmit (215) the multicast message to the newly joined child node. Transmitting the multicast message also may include storing the original multicast packet. The stored original multicast message may be used in order to count the corresponding ACK or LACK messages that are received.

The child nodes 130 and 140 receive (220 and 225) the multicast message, while child node 150 fails to receive (230) the multicast message. For example, a network collision, electromagnetic noise, a power failure, or other event may prevent the child node 150 from receiving the multicast message.

The child nodes 130 and 140 respond to the received multicast message by transmitting (235 and 240) ACK messages back to the first node 120. The first node 120 receives (245 and 250) the ACK messages from the child nodes 130 and 140 within an acknowledging subset of less than all of the child nodes of the first node. Note that the ACK messages are typically addressed to a source of the multicast message (e.g., an originating IP address) rather than to the first node 120. For example, ACK messages from only the child nodes 130 and 140 may be received, because the child node 150 did not receive the multicast message to respond to. It should be noted that at times node 150 may receive the broadcast/multicast message however the acknowledgement sent in reply gets lost. The first node 120 may respond by interpreting the loss of the acknowledgement message as if the broadcast/multicast message has not reached node 150. In some implementations, intermediate nodes between the child nodes 130 and 140 and the first node 120 (e.g., such as routers and repeaters that may provide data connectivity) do not examine the ACK messages.

The first node 120 determines (255), based on the ACK messages received from child nodes, that the child nodes have received the multicast message.

In some implementations, a list of ACKs received related to a multicast message can be compiled by the first node 120 as those ACKs that are received. The first node 120 identifies (260), using information revealed by the ACK messages about child nodes that received the multicast message, a non-acknowledging set of child nodes that represent a collection of the child nodes for which the ACK message has not yet been received. In some examples, this set of non-acknowledging nodes may be less than all child nodes. For example, the list of ACK sending child nodes can be compared to the list of all child nodes for which the multicast message is addressed, and any addressed node that did not return an ACK to the first node 120 can be identified as non-acknowledging. In some implementations, no explicit NAK or other message may need to be received by the first node 120 for the first node 120 to identify a child node as non-acknowledging.

The first node 120 transmits (265) the list of non-acknowledging nodes to the parent node 110 of the first node 120, and the parent node 110 receives the list of non-acknowledging nodes. In some implementations, the parent node 110 can use the list of non-acknowledging nodes to perform another action, such as identifying nodes in need of maintenance or re-transmitting the contents of the multicast message to those nodes. Note the list may be compressed thus reducing the number of acknowledgement messages sent to the first node.

In some implementations, the first node 120 transmits, in step 265, either a list of the ACK child nodes or a list of the non-acknowledge nodes.

The first node may decide whether to send a compressed list of acknowledging children or a list of non-acknowledging children based on whether the list of acknowledging nodes is larger than the list of non-acknowledging children.

For example, the multicast message received by the first node 120 can include a mission critical parameter that can be set to, for example, activated or not activated. If the mission critical parameter is set to activated, the first node 120 returns the list of non-acknowledge nodes in the step 265. If the mission critical parameter is set to not activated, for example, the first node 120 returns the list of ACK nodes in the step 265.

Alternatively or in addition, the first node 120 can determine the number of acknowledgement messages received compared to the relative to the size of the list of the number of children node. For example, the first node 120 may transmit the number of acknowledgements, or the percent of child nodes that have acknowledged, to the parent node 110. In some implementations, the first node 120 monitors for ACKs during a time window, which may be inversely related to the number of children first node 120 has, the distance between first node 120 and its most distant child, or any other combination of suitable measurements. After the time window has expired, the first node 120 transmits the list of non-acknowledgements to the parent node 110, the count of ACKs to the parent node 110 and/or retransmits the multicast message or a set of unicast messages to non-acknowledging child nodes. In some examples, the multicast message may only be retransmitted by the parent node 110 if less than a threshold number of ACKs have been received by the first node 120.

That is, in a well-performing LLN, the number of non-acknowledging nodes is much smaller than the number of acknowledging nodes. As such, the system may save resources such as memory, airtime, and computation power and still convey the same amount of information. Furthermore, the broadcasting application may save resources as the broadcasting application does not need to calculate the addresses to which it needs to resend the broadcast message because these addresses are explicitly given to it by the first node in the list of nodes which have not acknowledged recipient of the original message. Ultimately, the node 110 may either build a (compressed) list of acknowledging nodes or a list of non-acknowledging nodes, and it may be configured to chose among them depending on which list would be shorter.

FIGS. 3-7 illustrate the exemplary computer sub-network 100 with messages transmitted, such as those messages described in FIG. 2. More specifically, FIGS. 3-7 illustrate messages, in sequential order, that are created when the parent node 110 generates and transmits a multicast message addressed to at least one of the child nodes in the sub-network 100.

Figure 3:
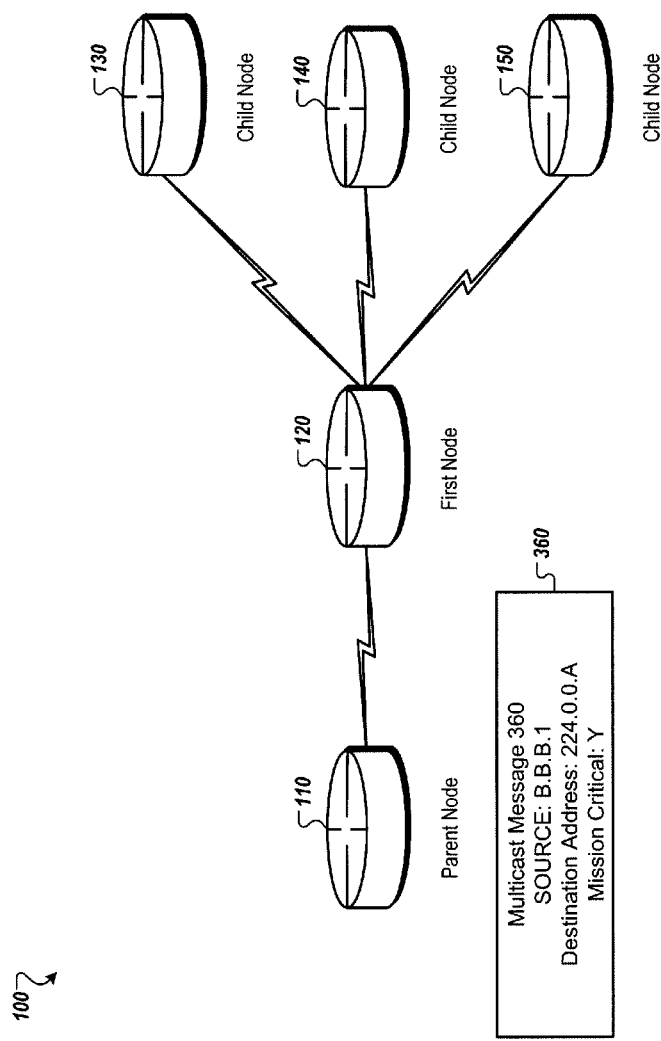
FIG. 3 illustrates an example of a computer sub-network, having a first node and corresponding parent and children nodes, with the parent node having a multicast message to be delivered.

FIG. 3 illustrates an example of a computer sub-network, having a first node and corresponding parent and children nodes, with the parent node having a multicast message to be delivered. The multicast message can be created, or received for retransmission, by the parent node 110, and transmitted to the first node 120.

The multicast message includes a header with routing information. A title, here "Multicast Message 360," can describe the multicast message. A source address, here "SOURCE: B.B.B.1," can list the address of the node that generated the multicast message 360. A destination address, here "Destination Address: 224.0.0.A," can list the address or addresses of the destination node or nodes for the multicast message 360. In some implementations, the destination address can be a block of node addresses, and the multicast message 360 is multicast (or broadcast) to each node in the block of addresses. A mission critical flag can be set to identify if the message is mission critical, a system message, or otherwise more or less important than other messages that may be transmitted in the sub-network 100. Note that while Internet Protocol version 4 is shown, the operations also may be performed using other addressing protocols such as Internet Protocol version 6, for example, being used with the RPL protocol.

In addition to header information, the multicast message 360 may include payload data (not shown). The contents and format of the payload data may reflect, for example, the configuration of the operating system of the nodes 110-150. In some implementations, the multicast message 360 may include an ordered array of bits, with the header occupying a string of bits at the beginning or end of the message, and the payload appended to the beginning or end of the header. Other data formats are possible.

Figure 4:
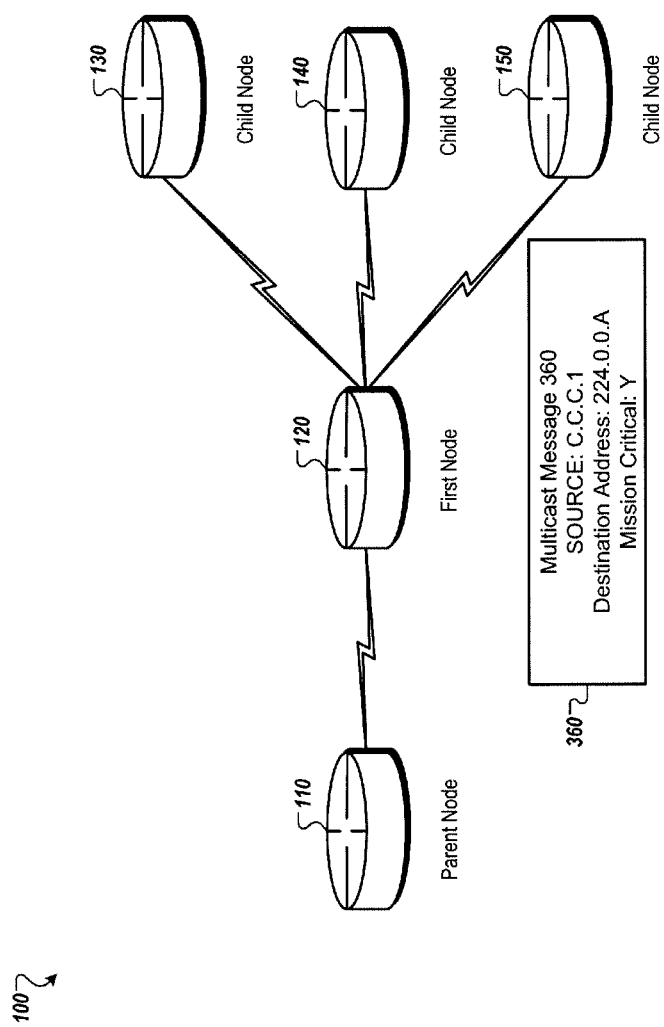
FIG. 4 illustrates an example of the FIG. 3 computer sub-network showing the multicast message saved by the first node, and ready for delivery to children nodes.

FIG. 4 illustrates an example of the FIG. 3 computer sub-network showing the multicast message saved by the first node, and ready for delivery to children nodes. After creation, the parent node transmits the multicast message 360 to the first node 120, and the first node 120 creates a multicast message 360.

In addition to multicast messages transmitted from the first node 120 to the child nodes 130, 140, and 150, multicast messages also may be received by child nodes of the sub-network 100 from nodes in other sub-networks. For example, other child nodes in sibling sub-networks to the sub-network 100 may transmit a multicast message to cousin nodes, which may effectively result in, for example, the child node 130 receiving the multicast message 360 before it is transmitted by the first node 120.

Figure 5:
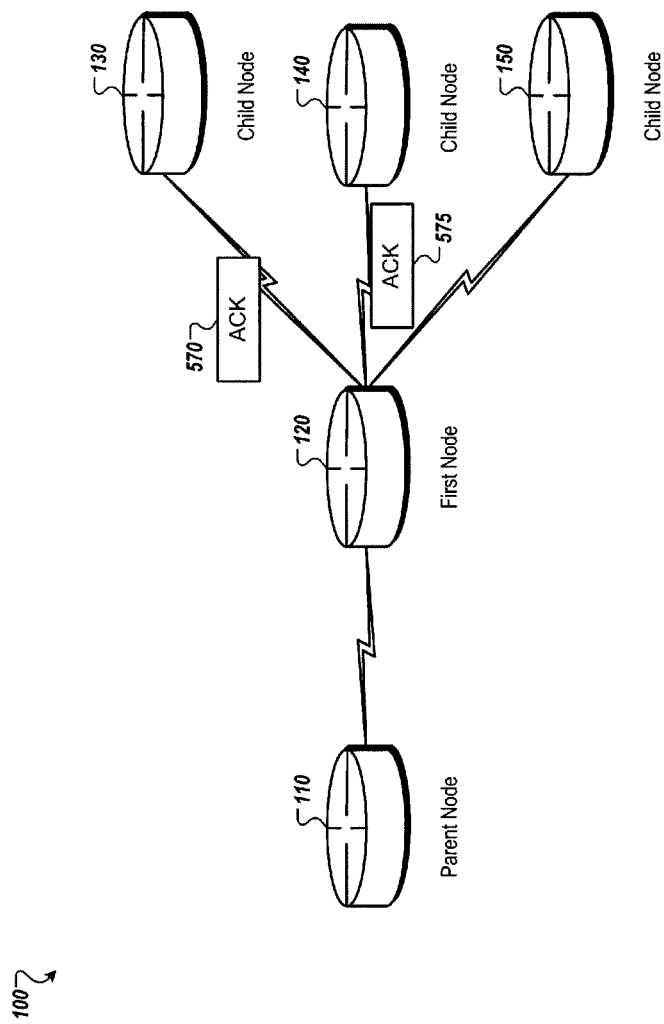
FIG. 5 illustrates an example of the FIG. 3 computer sub-network, showing ACK messages from children nodes that have received the multicast message from the first node.

FIG. 5 illustrates an example of the FIG. 3 computer sub-network, showing ACK messages from children nodes that have received the multicast message from the first node. After the first node 120 transmits the multicast message 360 to the child nodes 130, 140, and 150, the child nodes that have successfully received the multicast message 360 can respond to the source of the multicast message by responding through the first node 120 with an ACK message. That is, the acknowledgement messages are intercepted and not forwarded by the intermediate node.

In this example, the child nodes 130 and 140 have successfully received the multicast message 360, and the child node 150 has not. As previously described, the sub-network 100 may be a LLN, and a certain rate of dropped messages may be expected. In other examples, none, fewer, or all three child nodes 130, 140, and 150 may receive or fail to receive the multicast message 360.

An ACK 570 can be transmitted by the child node 130 to the source of the multicast message, and an ACK 575 can be transmitted by the child node 140 to the source of the multicast message. In some implementations, an ACK may be a very short message, compared in length to the multicast message 360, and indicate that the sending node has received a particular message. The ACKs may include the name or header information of the multicast message 360, for example, so that the first node 120 can identify which message is being acknowledged. This may be of particular concern, for example, in an asynchronous network where the order of message passing is not ensured. The child node 150, which did not successfully receive the multicast message 360, does not transmit an ACK (or the ACK may be lost).

Figure 6:
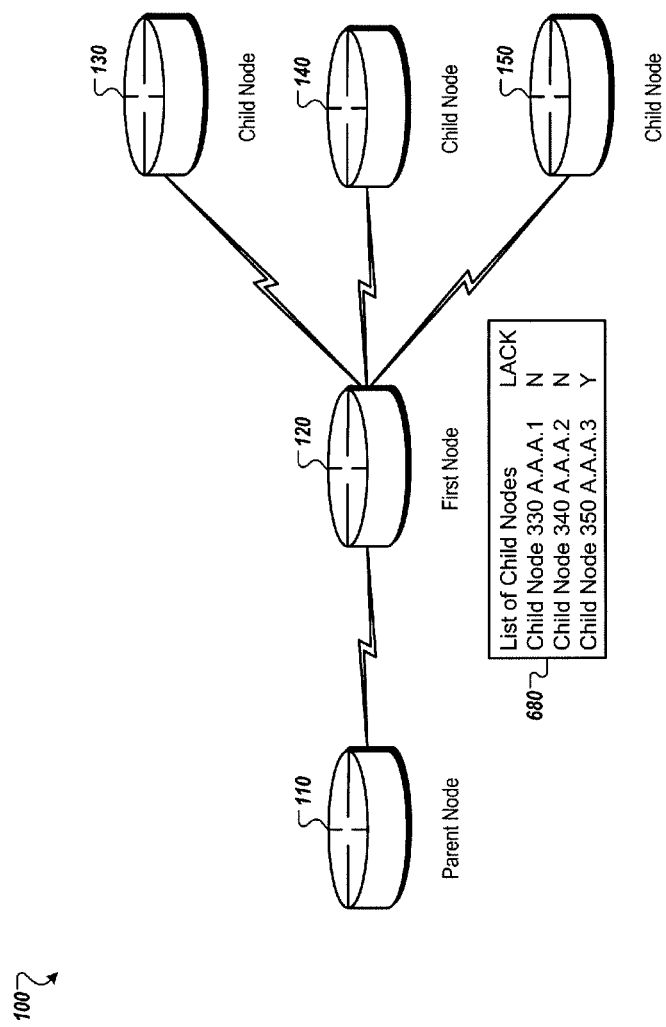
FIG. 6 illustrates an example of the FIG. 3 computer sub-network, showing a response table used to track which children nodes received the multicast message.

FIG. 6 illustrates an example of the FIG. 3 computer sub-network, showing a response table used to track which children nodes received the multicast message. The first node 120 creates a list of child nodes for which an ACK is received (here child node 130 and 140), and compares this list to a list of all child nodes or a list of all child nodes to which the multicast message 360 has been transmitted. From this comparison, the response table 680 can be created by the first node 120. The response table 680 can include a list or count of ACK responsive nodes, a list or count of non-acknowledging nodes, and/or a count or percentage of either. Note that the list is not limited to immediate children but can also include direct children, grand-children, and other children of even greater depth.

In some implementations, the first node 120 considers ACKs received during a response window after the multicast message 360 is sent, and can generate the response table 680 after the expiration of the window. In other implementations, the length of the window can be determined at least in part the number of children (in all orders) of the first node 120, the distance from the first node 120 to its most far child, or any other suitable combination of parameters. In still other implementations, this configuration can provide for windows that are greater for child nodes 130 that propagate the multicast messages to their own children (not shown, these children may be parent nodes in other sub-networks). It should be noted that, in general, the window of time of a parent node is always longer than the longest window of time of its children.

Once node 120 constructs the response table 680, node 120 compares the number of acknowledging nodes with the number of nodes that have not acknowledged the recipient of the broadcast message. In a well-operating system, the number of non-acknowledging nodes is much smaller and therefore first node 120 constructs an uplink message which includes only the addresses of the non-acknowledging nodes. By sending the small list of non-acknowledging nodes, the LLN conserves its limited resources. Similarly, in the rare event when the number of acknowledgements is smaller than the number of non-acknowledgements, the first node 120 may construct an uplink message that includes the list of addresses of the acknowledging nodes. The constructed message is sent uplink to the parent node.

It should be also noted that although nodes 130, 140, 150 were described as sending an acknowledgement for receiving the multicast message, these nodes also may elect to forward to the first node 120 only the list of their own non-acknowledging children nodes. A node may use this list to append to it (either implicitly or explicitly) an acknowledgement of its own reception of the multicast message.

Figure 7:
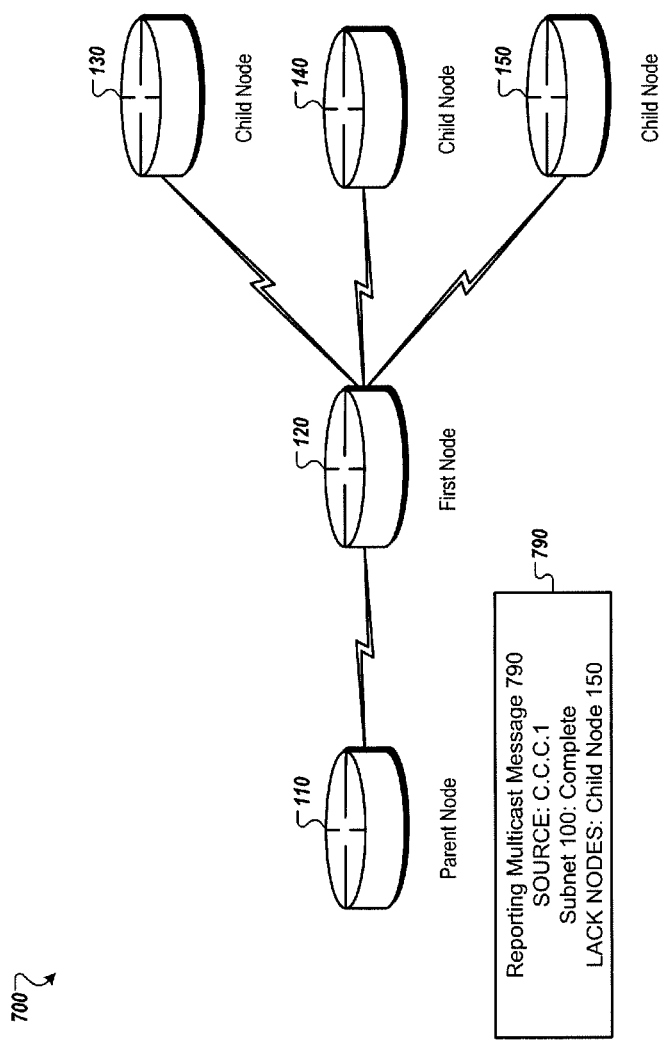
FIG. 7 illustrates an example of the FIG. 3 computer sub-network with a lack of acknowledgment.

FIG. 7 illustrates an example of the FIG. 3 computer sub-network with a subset of nodes from which acknowledgement has not been received and thus is lacking (referred to as a Lack of ACK (LACK)). After the first node 120 creates the response table 680, the first node 120 generates and transmits a lack of acknowledgement (LACK or LAK) 790 to the parent node 110. The LACK includes a list or a count of nodes that failed to respond or failed to respond with an ACK to a particular message, such as the multicast message 360. The LACK list can include the address of each particular node, or the LACK list may include a compressed block of addresses such that all LACK nodes are in the compressed block. Compressing the reporting requirements using a LACK list may dramatically reduce the traffic on a network, especially for nodes closer to the DAG root. In some implementations, a LACK indicates a different response than a NAK, which may indicate that a message is received, but received with errors (e.g., failing a checksum).

Figure 8:
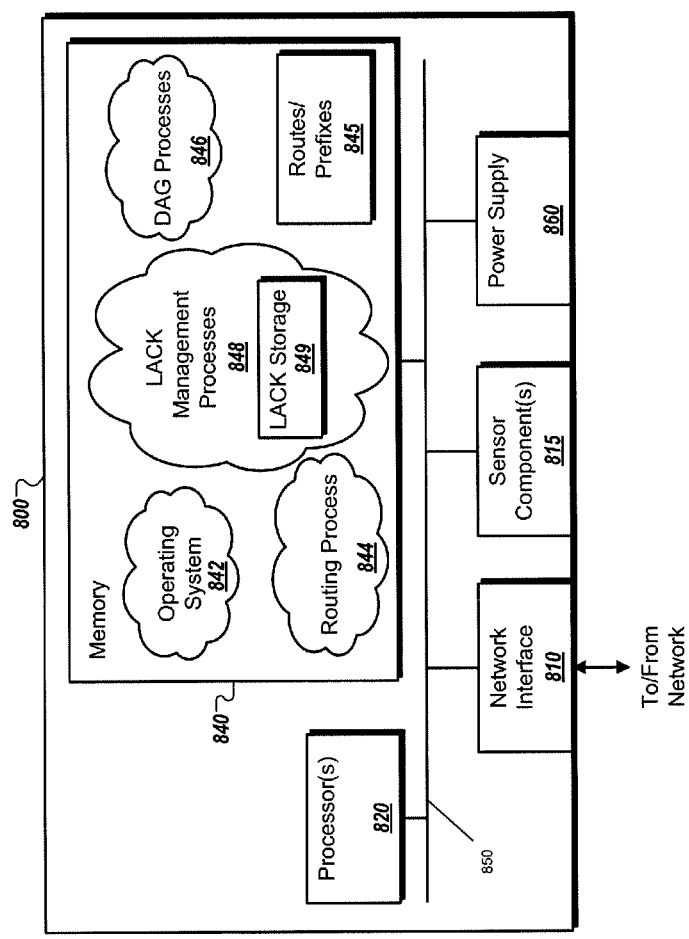
FIG. 8 illustrates an example network device/node.

FIG. 8 is a schematic block diagram of an example node/device 800 that may be used with one or more embodiments described herein, e.g., as a root node or sensor. The device may comprise one or more network interfaces 810, one or more sensor components 815 (e.g., sensors, actuators, etc.), a processor 820 (e.g., an 8-64 bit microcontroller), and a memory 840 interconnected by a system bus 850, as well as a power supply 860 (e.g., battery, plug-in, etc.). The network interface(s) 810 contain the mechanical, electrical, and signaling circuitry for communicating data over physical and/or wireless links coupled to the sub-network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, PLC protocols, etc.

The memory 840 comprises a plurality of storage locations that are addressable by the processor(s) 820 and the network interfaces 810 for storing software programs and data structures associated with the embodiments described herein. As noted above, certain devices may have limited memory or no memory (e.g., no memory for storage other than for programs/processes operating on the device). The processors 820 may comprise necessary elements or logic adapted to execute the software programs and manipulate the data structures, such as routes or prefixes 845 (notably on capable devices only). An operating system 842, portions of which are typically resident in memory 840 and executed by the processor(s), functionally organizes the device by, inter alia, invoking operations in support of software processes and/or services executing on the device. These software processes and/or services may comprise routing process/services 844, which may include an illustrative directed acyclic graph (DAG) process 846. A LACK management process 848 and associated storage 849 may be present for use in generating response tables and LACK messages. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 844 contains computer executable instructions executed by the processor 820 to perform functions provided by one or more routing protocols, such as proactive or reactive routing protocols as will be understood by those skilled in the art. These functions may, on capable devices, be configured to manage a routing/forwarding table 845 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 844 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs) may be used in a myriad of applications such as for "Smart Grid" and "Smart Cities." A number of characteristics are generally present in LLNs, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-15> by Winter, at al. (Nov. 6, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A number of implementations have been described. Nevertheless, it will be understood that various modifications may be made without departing from the spirit and scope of the disclosure. The disclosed implementations and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of distributing a multicast message in a Low power and Lossy Network (LLNs), the method comprising:
   receiving, at a first node in a multicast network, a multicast message from a parent node of the first node;
   transmitting the multicast message to child nodes of the first node in the multicast network;
   accessing a population of the child nodes to which the multicast message was transmitted;
   receiving, at the first node in the multicast network, acknowledgement messages which reveal child nodes that are among an acknowledging subset of less than all of the child nodes of the first node;
   comparing child nodes revealed by the received acknowledgement messages with child nodes determined to be among the population of child nodes to which the multicast message was transmitted;
   identifying, based on results of the comparison of child nodes revealed by the received acknowledgement messages with child nodes determined to be among the population of child nodes by which the multicast message is expected to be received, a non-acknowledging subset of less than all of the child nodes from which the acknowledgement message has not yet been received; and
   transmitting an indication of the non-acknowledging nodes to the parent node of the first node.

2. The method of claim 1 further comprising:
   accessing a threshold of time and using the time threshold to invoke transmission of the indication of non-acknowledging nodes.

3. The method of claim 1 wherein receiving the multicast message from the parent node includes:
   receiving the multicast message configuring the first node to employ a lack of acknowledgement (LACK) reporting configuration whereby the first node transmits an indication of the non-acknowledging nodes to the parent node.

4. The method of claim 1 wherein transmitting the multicast message to the child nodes includes transmitting to the child nodes that are associated with a specified subnet as identified by an address prefix.

5. The method of claim 4 further comprising:
   determining that a second node in the child nodes does not belong to a specified subnet;
   instructing the second node to join the specified subnet;
   transmitting, in response to determining that the second node has joined the specified subnet, the multicast message to the second node.

6. The method of claim 1 further comprising determining a subset of child nodes from which acknowledgement messages are expected, wherein comparing includes comparing child nodes revealed by the received acknowledgement messages with child nodes from which acknowledgement messages are expected.

7. The method of claim 1 further comprising:
   enabling the first node to intercept an acknowledgement message;
   recording an indication of the acknowledgement message for use in subsequent reporting; and
   terminating transmission of the acknowledgment messages.

8. The method of claim 1 further comprising determining a subset of child nodes from which acknowledgement messages are expected, wherein comparing is between child nodes revealed by the received acknowledgement messages and child nodes from which acknowledgement messages are expected.

9. The method of claim 1 wherein the indication of non-acknowledging nodes being transmitted includes a summary of either of the acknowledging or the non-acknowledging nodes.

10. The method of claim 1 wherein the indication of non-acknowledging nodes is transmitted as a summary of nodes that have not acknowledged.

11. The method of claim 1 further comprising providing compressed information about the list of nodes that sent an acknowledgement message.

12. The method of claim 1, further comprising providing compressed information about the list of nodes that did not sent an acknowledgement message.

13. A method of distributing a multicast message in a Low power and Lossy Network (LLN), the method comprising:
   receiving, at a first node in a multicast network, a multicast message from a parent node of the first node;
   transmitting the multicast message to child nodes of the first node in the multicast network;
   accessing a population of the child nodes by which the multicast message is expected to be received;
   receiving, at the first node in the multicast network, acknowledgement messages which reveal child nodes that are among an acknowledging subset of less than all of the child nodes of the first node;
   comparing child nodes revealed by the received acknowledgement messages with child nodes determined to be among the population of child nodes by which the multicast message was expected to be received;
   identifying, based on results of the comparison of child nodes revealed by the received acknowledgement messages with child nodes determined to be among the population of child nodes to which the multicast message was transmitted, a non-acknowledging subset of less than all of the child nodes from which the acknowledgement message has not yet been received;
   determining, based on identifying the non-acknowledging subset of less than all of the child nodes from which the acknowledgement message has not yet been received, a number of acknowledgement messages received on the first node relative to a size of the list of child nodes; and
   transmitting the number of acknowledgement messages that have been received to the parent node.

14. The method of claim 13 further comprising:
accessing a threshold of time and using the time threshold to invoke transmission of the number of acknowledgement messages that have been received.

15. The method of claim 14 wherein the threshold of time in the first node is automatically determined based on a combination of the number of children of the first node and the distance of the first node from a most distant child.

16. The method of claim 13 further comprising:
accessing a threshold of time and using the time threshold to invoke transmission of the number of acknowledgement messages that have been received; and
configuring the first node to selectively retransmit the multicast message if less than a threshold number of acknowledgement messages are received within the threshold period of time.

17. The method of claims 13 further comprising enabling child nodes to act as a proxy to aggregate information related to the distribution of the multicast message.

18. The method of claim 13 further comprising:
determining whether content in the multicast message should be sent to each node in the non-acknowledging subset of less than all of the child nodes using a multicast format or a unicast format;
constructing an appropriate unicast or multicast message for each node in the non-acknowledging subset; and
transmitting the appropriate unicast or multicast message for each node in the non-acknowledging subset.

19. A method of distributing a multicast message in a wireless mesh network, the method comprising:
receiving, at a first node in a multicast network, a multicast message from a parent node of the first node;
transmitting the multicast message to child nodes of the first node and to subsequent children in the multicast network;
accessing a population of the child nodes to which the multicast message was transmitted;
receiving, at the first node in the multicast network, non-acknowledgement messages which reveal child nodes that are among a non-acknowledging subset of less than all of the children nodes of the first node;
comparing child nodes revealed by the received non-acknowledgement messages with child nodes determined to be among the population of child nodes to which the multicast message was transmitted;
identifying, based on results of the comparison of child nodes revealed by the received non-acknowledgement messages with child nodes determined to be among the population of child nodes to which the multicast message was transmitted, a non-acknowledging subset of less than all of the child nodes from which the acknowledgement message has not yet been received;
determining, based on identifying the non-acknowledging subset of less than all of the child nodes from which the acknowledgement message has not yet been received, whether to send a lack of acknowledgment (LACK) message; and
constructing a LACK message to be sent by the first node to be sent using an uplink to the parent node.

20. A system configured to distribute a multicast message in a Low power and Lossy Network (LLN), the system comprising a processor and instructions that when executed on a processor cause the processor to:
receive, at a first node in a multicast network, a multicast message from a parent node of the first node;
transmit the multicast message to child nodes of the first node in the multicast network;
access a population of the child nodes to which the multicast message was transmitted;
receive, at the first node in the multicast network, acknowledgement messages which reveal child nodes that are among an acknowledging subset of less than all of the child nodes of the first node;
compare child nodes revealed by the received acknowledgement messages with child nodes determined to be among the population of child nodes to which the multicast message was transmitted;
identify, based on results of the comparison of child nodes revealed by the received acknowledgement messages with child nodes determined to be among the population of child nodes to which the multicast message was transmitted, a non-acknowledging subset of less than all of the child nodes from which the acknowledgement message has not yet been received; and
transmit an indication of the non-acknowledging nodes to the parent node of the first node.

21. A system configured to distribute a multicast message in a Low power and Lossy Network (LLN), the system comprising a processor and instructions that when executed on a processor cause the processor to:
receiving, at a first node in a multicast network, a multicast message from a parent node of the first node;
transmitting the multicast message to child nodes of the first node in the multicast network;
accessing a population of the child nodes to which the multicast message was transmitted;
receiving, at the first node in the multicast network, acknowledgement messages which reveal child nodes that are among an acknowledging subset of less than all of the child nodes of the first node;
comparing child nodes revealed by the received acknowledgement messages with child nodes determined to be among the population of child nodes to which the multicast message was transmitted;
identifying, based on results of the comparison of child nodes revealed by the received acknowledgement messages with child nodes determined to be among the population of child nodes to which the multicast message was transmitted, a non-acknowledging subset of less than all of the child nodes from which the acknowledgement message has not yet been received; and
determining, based on identifying the non-acknowledging subset of less than all of the child nodes from which the acknowledgement message has not yet been received, a number of acknowledgement messages received on the first node relative to a size of the list of child nodes; and
transmitting the number of acknowledgement messages that have been received to the parent node.

22. The system of claim 21 wherein the threshold of time in the first node is automatically determined based on a combination of the number of children of the first node and the distance of the first node from a most distant child.

23. The system of claim 21 further comprising instructions that include:
accessing a threshold of time and using the time threshold to invoke transmission of the indication of non-acknowledging nodes; and
configuring the first node to selectively retransmit the multicast message if less than a threshold number of acknowledgement messages are received within the threshold period of time.

24. The system of claims 21 further comprising instructions that include enabling child nodes to act as a proxy to aggregate information related to the distribution of the multicast message.

25. The system of claim 21 further comprising instructions that include:
   determining whether content in the multicast message should be sent to each node in the non-acknowledging subset of less than all of the child nodes using a multicast format or a unicast format;
   constructing an appropriate unicast or multicast message for each node in the non-acknowledging subset; and
   transmitting the appropriate unicast or multicast message for each node in the non-acknowledging subset.

26. A system configured to distribute a multicast message in a Low power and Lossy Network (LLN), the system comprising a processor and instructions that when executed on a processor cause the processor to:
   receiving, at a first node in a multicast network, a multicast message from a parent node of the first node;
   transmitting the multicast message to child nodes of the first node and to subsequent children in the multicast network;
   accessing a population of the child nodes to which the multicast message was transmitted;
   receiving, at the first node in the multicast network, non-acknowledgement messages which reveal child nodes that are among a non-acknowledging subset of less than all of the children nodes of the first node;
   comparing child nodes revealed by the received non-acknowledgement messages with child nodes determined to be among the population of child nodes to which the multicast message was transmitted;
   identifying, based on results of the comparison of child nodes revealed by the received non-acknowledgement messages with child nodes determined to be among the population of child nodes to which the multicast message was transmitted, a non-acknowledging subset of less than all of the child nodes from which the acknowledgement message has not yet been received;
   determining, based on identifying the non-acknowledging subset of less than all of the child nodes from which the acknowledgement message has not yet been received, whether to send a lack of acknowledgment (LACK) message; and
   constructing a LACK message to be sent by the first node to be sent using an uplink to the parent node.

27. A computer program stored on a non-transitory computer readable medium, the computer program comprising instructions that when executed on a processor cause the processor to perform operations including:
   receiving, at a first node in a multicast network, a multicast message from a parent node of the first node;
   transmitting the multicast message to child nodes of the first node in the multicast network;
   accessing a population of the child nodes to which the multicast message was transmitted;
   receiving, at the first node in the multicast network, acknowledgement messages which reveal child nodes that are among an acknowledging subset of less than all of the child nodes of the first node;
   comparing child nodes revealed by the received acknowledgement messages with child nodes determined to be among the population of child nodes to which the multicast message was transmitted;
   identifying, based on results of the comparison of child nodes revealed by the received acknowledgement messages with child nodes determined to be among the population of child nodes to which the multicast message was transmitted, a non-acknowledging subset of less than all of the child nodes from which the acknowledgement message has not yet been received; and
   transmitting an indication of the non-acknowledging nodes to the parent node of the first node.

28. A computer program stored on a non-transitory computer readable medium, the computer program comprising instructions that when executed on a processor cause the processor to perform operations including:
   receiving, at a first node in a multicast network, a multicast message from a parent node of the first node;
   transmitting the multicast message to child nodes of the first node in the multicast network;
   accessing a population of the child nodes to which the multicast message was transmitted;
   receiving, at the first node in the multicast network, acknowledgement messages which reveal child nodes that are among an acknowledging subset of less than all of the child nodes of the first node;
   comparing child nodes revealed by the received acknowledgement messages with child nodes determined to be among the population of child nodes to which the multicast message was transmitted;
   identifying, based on results of the comparison of child nodes revealed by the received acknowledgement messages with child nodes determined to be among the population of child nodes to which the multicast message was transmitted, a non-acknowledging subset of less than all of the child nodes from which the acknowledgement message has not yet been received; and
   determining, based on identifying the non-acknowledging subset of less than all of the child nodes from which the acknowledgement message has not yet been received, a number of acknowledgement messages received on the first node relative to a size of the list of child nodes; and
   transmitting the number of acknowledgement messages that have been received to the parent node.

29. A computer program stored on a non-transitory computer readable medium, the computer program comprising instructions that when executed on a processor cause the processor to perform operations including:
   receiving, at a first node in a multicast network, a multicast message from a parent node of the first node;
   transmitting the multicast message to child nodes of the first node and to subsequent children in the multicast network;
   accessing a population of the child nodes to which the multicast message was transmitted;
   receiving, at the first node in the multicast network, non-acknowledgement messages which reveal child nodes that are among a non-acknowledging subset of less than all of the children nodes of the first node;
   comparing child nodes revealed by the received non-acknowledgement messages with child nodes determined to be among the population of child nodes to which the multicast message was transmitted;
   identifying, based on results of the comparison of child nodes revealed by the received non-acknowledgement messages with child nodes determined to be among the population of child nodes to which the multicast message was transmitted, a non-acknowledging subset of less than all of the child nodes from which the acknowledgement message has not yet been received;
   determining, based on identifying the non-acknowledging subset of less than all of the child nodes from which the acknowledgement message has not yet been received, whether to send a lack of acknowledgment (LACK) message; and constructing a LACK message to be sent by the first node to be sent using an uplink to the parent node.

* * * * *